United States Patent
Cavello

[11] Patent Number: 5,822,185
[45] Date of Patent: *Oct. 13, 1998

[54] ERGONOMIC DOCKING STATION FOR A PORTABLE COMPUTER

[75] Inventor: Christopher Cavello, Austin, Tex.

[73] Assignee: Dell U.S.A., L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 763,840

[22] Filed: Dec. 6, 1996

[51] Int. Cl.⁶ .................................. G06F 1/16; H05K 7/10
[52] U.S. Cl. ............................................................. 361/686
[58] Field of Search ...................................... 361/686, 680, 361/681, 683; 364/708.1; 312/223.1, 223.2; G06F 1/16

[56] References Cited

U.S. PATENT DOCUMENTS

| | | | |
|---|---|---|---|
| 5,175,671 | 12/1992 | Sasaki | 361/686 |
| 5,352,033 | 10/1994 | Gresham et al. | |
| 5,396,400 | 3/1995 | Register et al. | |
| 5,436,792 | 7/1995 | Leman et al. | 361/686 |
| 5,488,572 | 1/1996 | Belmont | 364/514 R |
| 5,526,493 | 6/1996 | Shu | |
| 5,552,959 | 9/1996 | Penniman et al. | |
| 5,579,528 | 11/1996 | Register | |
| 5,592,362 | 1/1997 | Ohgami et al. | 361/686 |
| 5,594,622 | 1/1997 | Hosoya et al. | 361/686 |
| 5,619,397 | 4/1997 | Honda et al. | 361/686 |
| 5,633,782 | 5/1997 | Goodman et al. | 361/683 |
| 5,648,762 | 7/1997 | Ichimura et al. | 340/825.31 |
| 5,687,060 | 11/1997 | Ruch et al. | 361/686 |

FOREIGN PATENT DOCUMENTS 406195150  7/1994  Japan ................................. G06F 1/16

Primary Examiner—Lynn D. Feild
Attorney, Agent, or Firm—Haynes and Boone, L.L.P.

[57] ABSTRACT

An ergonomic docking station for a portable computer that enables the use of the portable computer display while docked and raises and orients the portable computer display to within a desirable ergonomic position and viewing range. The docking station includes a housing formed by an upper housing portion and a lower housing portion for housing a printed circuit board, wherein the upper housing portion is generally J-shaped for receiving the portable computer and the lower housing portion is generally rectangular but includes downwardly extending supports for orienting the docking station at a predetermined angle from a table top, desk top, or the like. The docking station further includes an ejection mechanism within the housing for disengaging the portable computer from the docking station. The ejection mechanism includes solenoid-type ejectors housed within the housing and activating electromagnets located within the lower housing portion.

20 Claims, 3 Drawing Sheets

ERGONOMIC DOCKING STATION FOR A PORTABLE COMPUTER

TECHNICAL FIELD

The invention relates generally to docking stations for portable personal computers and, more particularly, to a docking station having an improved ergonomic design.

BACKGROUND OF THE INVENTION

Portable personal computers (PCs) were first introduced in the early 1980s and have since enjoyed great commercial success and consumer acceptance. As the portable PC market has grown, manufacturers have produced portable PCs with continually improved capabilities and displays and that are increasingly more powerful and faster than their predecessors. This trend has resulted in many users replacing the more traditional desktop PC with portable PCs as their primary or sole computing device.

Portable PCs, however, have certain disadvantages as compared to desktop PCs due to the size constraints necessary to make portable PCs portable. Most noticeably, the keyboard attached to a portable PC is much smaller than those used in connection with desktop PCs, with both fewer keys resulting in less functionality, and smaller keys which hamper typing. Moreover, the attached portable PC keyboard is just that, attached, thereby causing the user to position the PC such that the keys are reachable and the display viewable. Such positioning requires the portable PC to be in a poor ergonomic orientation with respect to the user, resulting in user discomfort if used for long periods of time. And as the keyboard is attached to the display, the user is not free to periodically adjust such positioning as is needed for user comfort. In addition, the height of the standard portable PC display requires the user to look down at a slight angle. Ergonomic desirability would have the user either looking horizontally or only slightly downward between approximately 0° and −15° (where 0° is horizontal). There is also a need to interface portable PCs with established PC networks to connect with common servers, electronic mail, modem pools and the like common in today's office environments.

To overcome some of these disadvantages associated with portable PCs, docking stations have been developed that provide portable PCs with a plurality of connectors via a portion replicator to enable portable PCs to be interfaced with PC networks and desktop computer peripheral equipment, such as larger keyboards, detached mice, monitors, printers and the like. The port replicator replicates the connectors, or ports, typically found on desktop PCs that serve to connect the PC to a network or peripheral equipment. Thus, once docked with a docking station, such peripheral equipment or network connections can be interfaced with the portable PC. In this manner, the portable PC user can connect a full size keyboard to the portable PC to take advantage of the larger keys and enhanced functionality of such keyboards. In addition, as the keyboard is detached from the portable PC and only connected by a standard computer cable, the user can position the keyboard to an ergonomically attractive position, and can reposition the keyboard as needed for user comfort.

Known docking stations, however, do not improve upon the ergonomically unsatisfactory orientation of the portable PC display, and many, such as the docking station described in U.S. Pat. No. 5,347,425, require the expense and space requirements of an external monitor to be attached to the docking station. Typically, portable PC docking stations include a housing adapted to rest on a horizontal surface having a port replicator with a rear side from which the port replicator connectors extend horizontally and a front side from which a pin connector extends horizontally that is engagable with a mating connector extending from the rear of the portable PC. Thus, once connected to the docking station, the portable PC is also in a horizontal orientation. If the portable PC display is useable while in the docking station, the user will again be forced to look downward to view the display. If the docking station disables the display of the portable PC, then the user must purchase and provide space for an external monitor.

Therefore, what is needed is a docking station for a portable PC that utilizes the display of the portable PC while providing the full ergonomic advantages of a desktop PC by repositioning the portable PC display into an ergonomically beneficial orientation.

SUMMARY OF THE INVENTION

The foregoing problems are solved and a technical advance is achieved by a portable PC docking station that enables the use of the portable PC display while docked and raises and orients the portable PC display to within the desirable ergonomic position and viewing range. In a departure from the art, the docking station is designed to receive the portable PC in a generally vertical position and enable use of the portable PC display while docked. In this manner, the portable PC display can be raised relative to the table top to the desirable approximate 0° to 15° viewing range.

In one embodiment, the docking station includes a housing formed by an upper housing portion and a lower housing portion for housing a printed circuit board. The upper housing portion is generally J-shaped for receiving the PC. The lower housing portion is generally rectangular but includes downwardly extending supports for orienting the docking station at a predetermined angle "A" from a table top, desk top, or the like. The angle "A" is predetermined to enable the display of the PC to extend generally vertically while in use and is preferably around 60 degrees.

The board contains a conventional pin connector for engaging the pin connector of the PC, thereby providing an electrical connection between the PC and the board of the docking station. The location of the connector will depend upon the location of the pin connector of the PC. The board further contains various electronics for enabling the docking station to replicate the ports typically found on desktop PCs that serve to connect the desktop PC to a network and/or peripheral equipment, including conventional I/O connectors and power connectors.

The docking station further includes an ejection mechanism for disengaging the PC from the docking station. The ejection mechanism includes solenoid-type or similarly activated ejectors housed with the housing and activated by electromagnets located within the lower housing portion. When activated, the ejectors extend through openings in the surface of the upper housing portion and engage the bottom surface of the PC for decoupling the pin connectors of the PC and the docking station. A switch is provided on the upper housing portion and is electrically connected to the electromagnets for enabling their activation. This switch can also shut down dock to reduce arcing during disengagement.

A technical advantage achieved with the invention is that it enables the user of a portable PC to use the display of a docked portable PC and eliminates the need for a separate monitor.

Another technical advantage achieved with the invention is the improved ergonomics of using a docked portable PC.

Another technical advantage achieved with the invention is a reduction in desk space required to use a docked portable PC.

DETAILED DESCRIPTION OF THE PREFERRED EMBODIMENT

Figure 1:
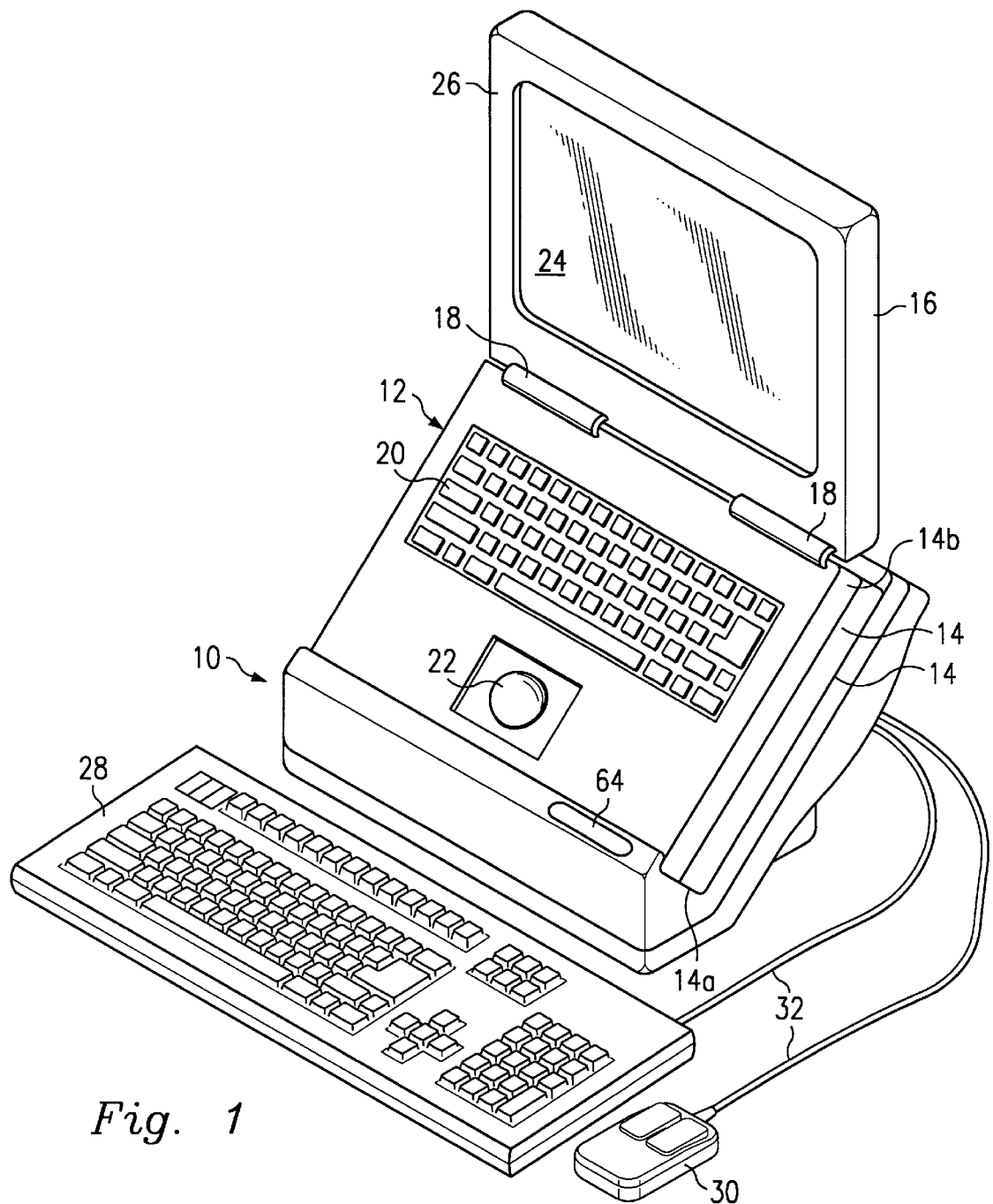
FIG. 1 is a perspective view of an exemplary portable PC docked in the docking station of the present invention.

FIG. 1 is a perspective view of a portable PC docking station 10 embodying features of the present invention and showing a portable PC 12 docked therein. The PC 12 is of the conventional "clamshell" design and includes a base 14 and a lid 16 rotatably connected to the base 14 via one or more hinges 18 or other known arrangements for enabling the lid 16 to be opened and closed in a conventional manner by rotating the lid 16 relative to the base 14. Preferably, the lid 16 should rotate in excess of 90°. The base 14 is generally rectangular having front and rear sides 14a and 14b and a bottom surface 14c. The bottom surface 14c is generally planar and adapted to rest the PC 12 on a table top, desk top, or the like. Although not shown on the drawings, it is understood that the PC 12 contains a conventional pin connector (not shown) for providing an electrical connection to the docking station 10. In a preferred embodiment, the pin connector is located on the bottom surface 14c as is further described below.

A keyboard 20 and a cursor controller 22, such as a trackball, both for use in inputting information to the PC 12, are located on the base 14. Similarly, a display 24, such as a liquid crystal display ("LCD"), is retained within the lid 16 in a conventional manner by a frame or bezel 26 that surrounds the periphery of the display 24. The PC 12 is operable in a stand-alone mode through the use of the attached keyboard 20, cursor controller 22 and display 24, or alternatively, the PC 12 can be inserted into and electrically connected, or "docked," into the docking station 10 of the present invention. Once docked, the PC 12 can be electrically connected to PC networks and peripheral computer equipment, such as a detached keyboard 28 and a detached mouse-like cursor controller 30 via electrical cables 32 as shown in FIG. 1.

Figure 2:
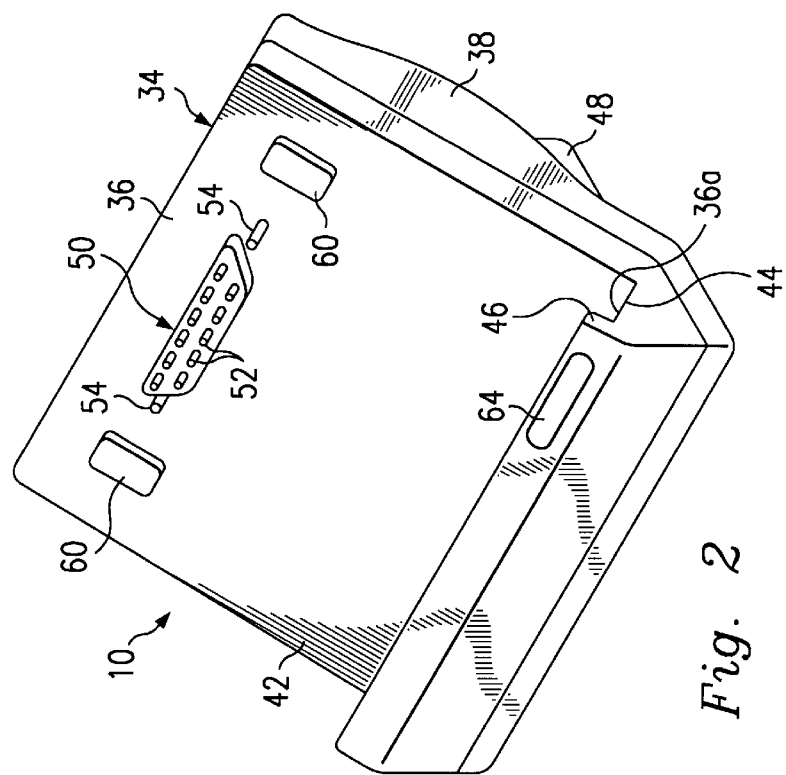
FIG. 2 is a perspective view of the docking station of the present invention.
Figure 3:
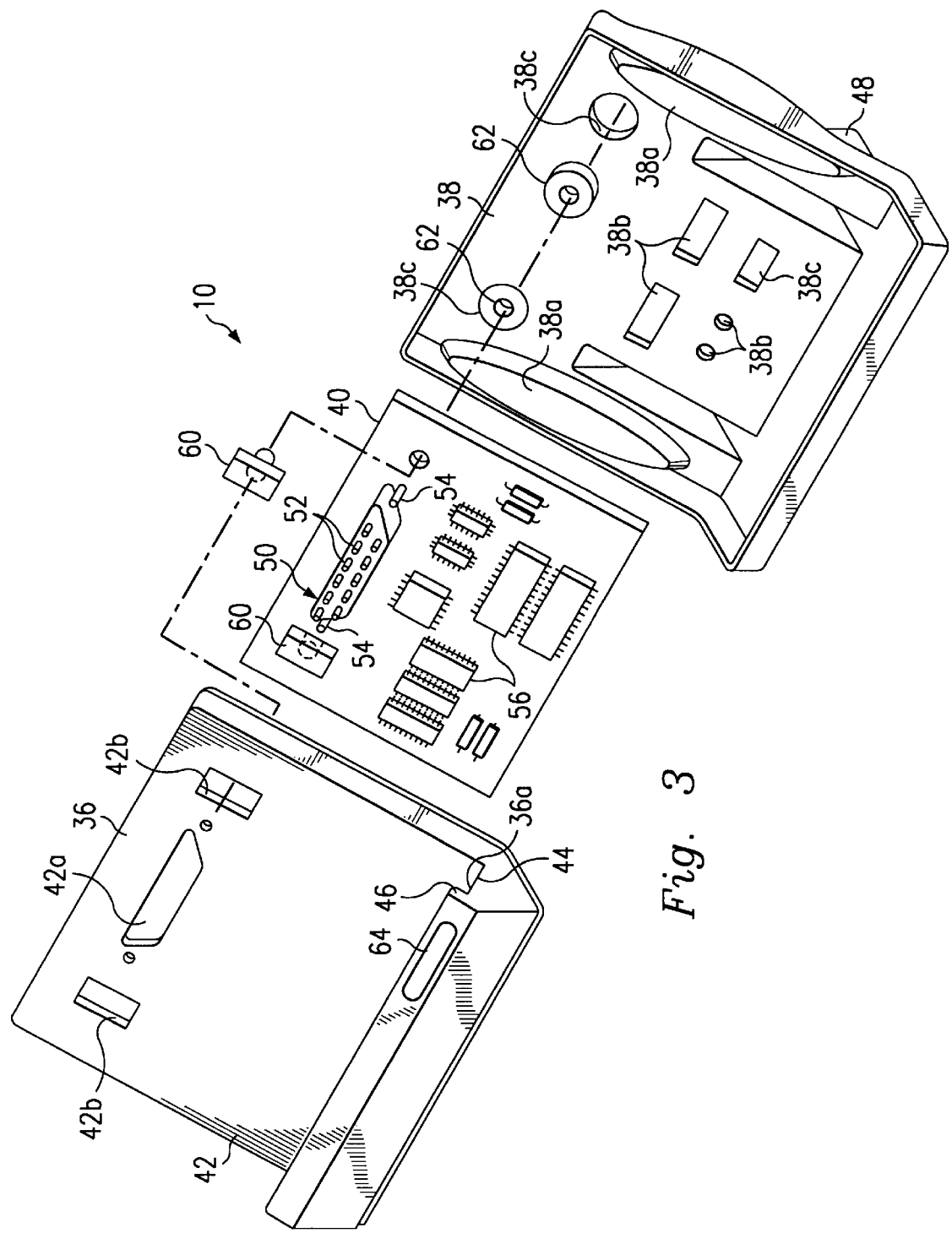
FIG. 3 is an exploded view showing the components of the docking station of the present invention.

Referring now to FIGS. 2 and 3, the docking station 10 includes a housing 34 formed by an upper housing portion 36 and a lower housing portion 38 secured together in a conventional method, such as by adhesive, for housing a printed circuit board 40. The upper housing portion 36 is generally J-shaped for receiving the PC 12 and includes a generally planar upper surface 42 adapted for engaging the bottom surface 14c of the base 14, a generally planar surface 44 extending perpendicular to the surface 40 and adapted for receiving the front side 14a of the base 14, and a lip section 46, which collectively form a trough 36a. The lower housing portion 38 is generally rectangular but (referring to FIG. 4) includes finger gripping detents 38a and downwardly extending supports 48 for orienting the docking station 10 at a predetermined angle "A" from a table top, desk top, or the like. The angle "A" should be predetermined to enable the display 24 to extend generally vertically while in use while the PC 12 is docked in the docking station 12, and is preferably around 60 degrees.

The board 40 contains a conventional pin connector 50 having connector pins 52 and guide pins 54 that extend through an opening 42a in the surface 42 of the upper housing portion 36 for engaging the pin connector of the PC 12 (not shown) and thereby providing an electrical connection between the PC 12 and the board 40 of the docking station 10. It is understood that the location of the connector 50 and the opening 42a depend upon the location of the pin connector of the PC 12 and have thus been shown in the drawings to be located at only one possible position.

Figure 4:
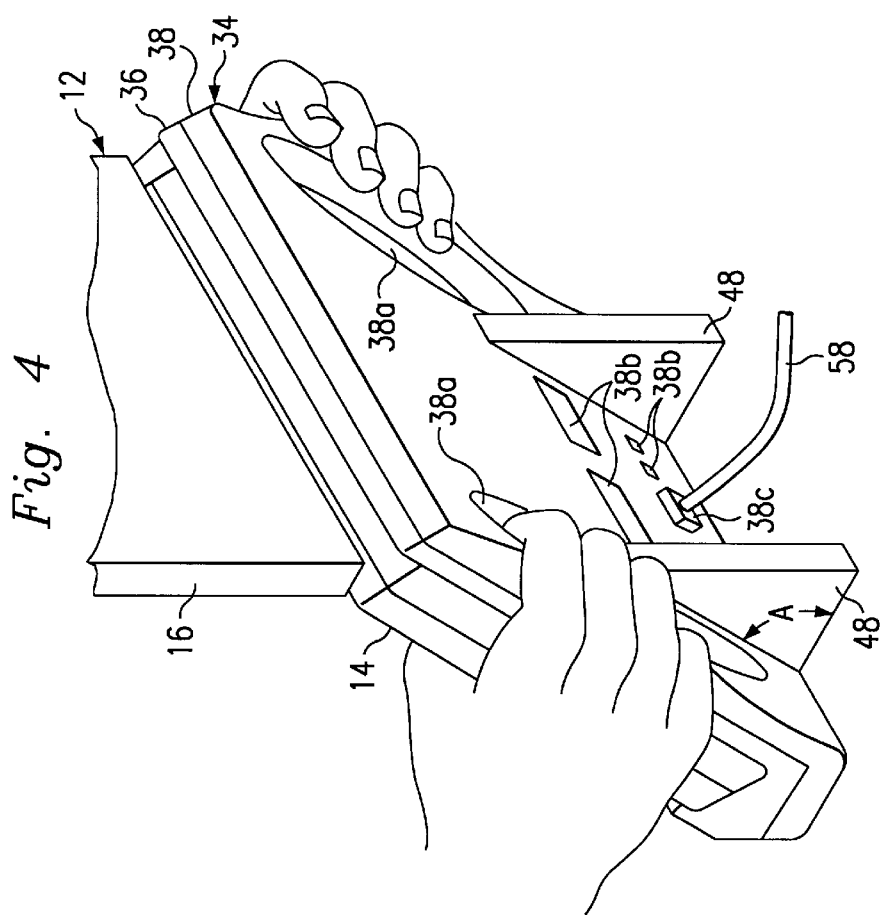
FIG. 4 is a perspective view of the rear of the docking station of the present invention demonstrating the docking procedure.

The board 40 further contains various electronics 56 for enabling the docking station 10 to replicate the ports typically found on desktop PCs that serve to connect the desktop PC to a network and/or peripheral equipment, including conventional I/O connectors (not shown) that extend through openings 38b in the lower housing portion 38. An opening 38c is also provided in the lower housing portion 38 for allowing the board 50 to receive electrical power via a power cord 58 (FIG. 4).

The docking station 10 further includes an ejection mechanism for disengaging the PC 12 from the docking station 10. The ejection mechanism includes solenoid-type or similar ejectors 60 housed within the housing 34 and activated by electromagnets 62 located within recesses 38c in the lower housing portion 38. When activated, the ejectors 60 extend through openings 42b in the surface 42 of the upper housing portion 36 and engage the bottom surface 14c of the PC 12 for decoupling the pin connectors of the PC 12 and the docking station 10. A switch 64 is provided on the upper housing portion 36 and is electrically connected to the electromagnets 62 for activating the electromagnets 62 and the ejectors 60.

In operation, the power cord 58, the detached keyboard 28, the cursor controller 30 and any other desired network or peripheral computer equipment are connected to the docking station 10 in a conventional manner via the I/O connectors (not shown) extending through the openings 38b and 38c of the lower housing portion 38. The docking station 10 is powered through electricity provided by the power cord 58, and once powered, the PC 12 is docked into the docking station 10 by inserting the front side 14a of the base 14 of the PC 12 into the trough 36a formed in the upper housing portion 36. The pin connector (not shown) of the PC 12 is connected to the pin connector 50 of the docking station 10 by manually engaging the detents 38a and squeezing the PC 12 down onto the upper housing portion 42 of the docking station as is shown in FIG. 4.

Once docked, the PC 12 is turned on in a conventional manner, but is now powered via the docking station 10, thereby recharging (or possibly conserving) the battery power of the PC. The lid 16 is opened and positioned to a generally vertical orientation or to any other ergonomically desired position via adjustment of the lid 16 and the orientation of the docking station 10 relative to the user. Likewise, the positions of the detached keyboard 28 and the cursor controller 30 can be ergonomically positioned due to the flexibility of the cables 32.

When removal of the PC 12 from the docking station 10 is desired, activation of the switch 64 energizes the electromagnets 62, thereby activating the ejectors 60 to push against the base 14 of the PC 12 and causing the decoupling of the pin connectors of the PC 12 and the docking station 10. Software can be provided within the electronics 56 to ensure that the switch 64 can only activate the ejection mechanism of the docking station 10 once the PC 12 is in a safe condition for undocking, i.e., where no data will be lost.

The foregoing invention results in numerous technical advantages. First, the docking station 10 enables the user of the PC 12 to use the display of the docked PC 12, thereby eliminating the need for a separate monitor. This saves the user both expense and extra desk space. Moreover, as the docking station 10 positions the PC 12 at an incline, even more desk space is saved as opposed to having to place the PC 12 flat during operation. Primarily, however, the docking station 10 improves the ergonomics of using a docked PC. By raising the display of the docked PC, the user is able to orient the display within the desirable 0° (approximately) and 15° (approximately) viewing range (wherein 0° is the vertical orientation), consistent with the normal viewing range of the user without undue movement of the head from a level, resting position. This added height, together with the ability to move the display relative to the external keyboard 28, allows users to avoid discomfort and prevent repetitive stress related injuries.

It is understood that the present invention can take many forms and embodiments. The embodiments shown herein are intended to illustrate rather than to limit the invention, it being appreciated that variations may be made without departing from the spirit or the scope of the invention. For example, the pin connector 50 of the docking station 10 can be located in various positions, such as in the surface 44 of the upper housing portion 36 that forms the bottom of the trough 36a. Such a location, which assumes that the corresponding PC pin connector is located on the front edge of the PC, would allow the user to dock the PC by pushing it down into the trough 36a. Alternatively, the docking station 10 could include a portion opposite the trough 36a along the top of the housing 34 for housing the pin connector 50, which would correspond to current PC pin connector locations.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A computer system comprising:
    a portable computer having a bottom surface for supporting such portable computer;
    a docking station for receiving the portable computer;
    the docking station including a housing having a first surface for engaging said bottom surface of the portable computer and a second surface opposite said first surface;
    a detent extending downward from said second surface for ergonomically gripping said housing;
    means connected to said second surface for orienting said first surface at a fixed angle to the horizontal, said orienting means being immovable with respect to said second surface; and
    a connector associated with said housing for electrically coupling the portable computer to said housing.

2. The docking station of claim 1 wherein said first surface is substantially coextensive with the bottom surface of the portable computer.

3. The docking station of claim 1 wherein the portable computer has a tiltable display and said orienting means orients said display in a substantially vertical plane for viewing.

4. The docking station of claim 1 wherein said orienting means comprises supports extending downwardly from said housing.

5. The docking station of claim 1 further comprising an ejector mechanism within said housing for de-coupling the portable computer from said housing.

6. The docking station of claim 5 wherein said ejector mechanism comprises solenoid-type ejectors housed within electromagnets for engaging said bottom surface of the portable computer.

7. A docking station for a portable computer, comprising:
    a generally rectangular housing for receiving a connector electrically coupling to the portable computer;
    means for supporting said housing at a fixed angle to the horizontal, said supporting means being immovable with respect to said housing; and
    a detent integral with the perimeter of and extending downward from said housing for ergonomically gripping said housing.

8. The docking station of claim 7 wherein said angle is approximately 60 degrees.

9. The docking station of claim 7 wherein said supporting means comprises supports extending downwardly from said housing.

10. The docking station of claim 7 further comprising an ejector mechanism within said housing for de-coupling the portable computer from said housing.

11. The docking station of claim 10 wherein said ejector mechanism comprises solenoid-type ejectors housed within electromagnets for engaging the portable computer.

12. A docking station for a portable computer comprising a housing formed by an upper housing portion and a lower housing portion for housing a printed circuit board, wherein said upper housing portion is generally J-shaped for receiving the portable computer and said lower housing portion is generally rectangular but includes a detent extending downward from the perimeter of said lower housing portion and downwardly extending supports fixedly attached to said lower portion for orienting the docking station at a fixed predetermined angle from a horizontal surface, said supports being immovable with respect to said lower housing portion.

13. The docking station of claim 12 wherein said board comprises a pin connector for connecting to and providing an electrical connection to the portable computer.

14. The docking station of claim 12 wherein said board further comprises I/O connectors.

15. The docking station of claim 12 further comprising an ejection mechanism within said housing for disengaging the portable computer from the docking station.

16. The docking station of claim 15 wherein said ejection mechanism includes solenoid-type ejectors housed within said housing and activating electromagnets disposed within said lower housing portion.

17. The docking station of claim 16 further comprising a switch disposed on said upper housing portion and electrically connected to said electromagnets for enabling their activation.

18. The docking station of claim 12 wherein said predetermined angle is around 60 degrees.

19. A docking station for a portable computer, the portable computer having a bottom surface for supporting such portable computer, said docking station comprising:
    a housing having a first surface for engaging said bottom surface of the portable computer;
    a detent extending downward from said second surface for ergonomically gripping said housing;

an ejector secured to said first surface, wherein said ejector is capable of separating the computer from said docking station when said ejector is activated;

a support fixedly connected to said housing for supporting said first surface at a fixed angle to the horizontal, said support being immovable with respect to said housing; and a connector associated with said housing for electrically coupling the portable computer to said housing.

20. A docking station for a portable computer, the portable computer having a bottom surface for supporting such portable computer, said docking station comprising:

a housing having a first surface for engaging said bottom surface of the portable computer and a j-shaped second surface secured perpendicularly to said first surface for supporting the portable computer;

a support immovably secured to said housing for supporting said first surface at a fixed angle to the horizontal;

a detent coupled to the housing for ergonomically gripping said housing; and a connector associated with said housing for electrically coupling the portable computer to said housing.

* * * * *